(12) United States Patent  
Chien

(10) Patent No.: US 7,958,299 B2
(45) Date of Patent: Jun. 7, 2011

(54) HARD DISK SYSTEM STATE MONITORING METHOD

(75) Inventor: Ming-Hung Chien, Taipei (TW)

(73) Assignee: Inventec Corporation, Taipei (TW)

( * ) Notice: Subject to any disclaimer, the term of this patent is extended or adjusted under 35 U.S.C. 154(b) by 346 days.

(21) Appl. No.: 12/389,379

(22) Filed: Feb. 20, 2009

(65) Prior Publication Data

US 2010/0131693 A1 May 27, 2010

(30) Foreign Application Priority Data

Nov. 21, 2008 (TW) .............................. 97145169 A

(51) Int. Cl.
*G06F 12/00* (2006.01)
(52) U.S. Cl. ........................................................... 711/4
(58) Field of Classification Search .................. None
See application file for complete search history.

(56) References Cited

U.S. PATENT DOCUMENTS

| 7,492,541 B2* | 2/2009 | Gokita .............................. 360/69 |
| 2002/0002440 A1* | 1/2002 | Sakai ................................ 702/35 |
| 2005/0160189 A1* | 7/2005 | McNeill et al. .................... 710/1 |

* cited by examiner

*Primary Examiner* — Hiep T Nguyen
(74) *Attorney, Agent, or Firm* — CKC & Partners Co., Ltd.

(57) ABSTRACT

A hard disk system state monitoring method is provided. The hard disk system state monitoring method is to monitor the state of a hard disk system. The hard disk system comprises a backplane, an expander and a plurality of hard disks adapted in the device slots of the backplane. The hard disk system state monitoring method comprises the steps of: retrieving a logic and physical address mapping table from the expander; retrieving a physical address and device slot number mapping table; generating a logical address and device slot number mapping table according to the logic and physical address mapping table and physical address and device slot number mapping table; receiving a plurality of hard disk instant state signals; and establishing a hard disk system state database according to the logical address and device slot number mapping table and the hard disk instant state signals.

9 Claims, 3 Drawing Sheets

HARD DISK SYSTEM STATE MONITORING METHOD

RELATED APPLICATIONS

This application claims priority to Taiwan Application Serial Number 97145169, filed Nov. 21, 2008, which is herein incorporated by reference.

BACKGROUND

1. Field of Invention

The present invention relates to a monitoring method. More particularly, the present invention relates to a hard disk system state monitoring method.

2. Description of Related Art

A server or a large-scale computer system generally comprises lots of hard disk to meet the requirement of large amount of data storage. Backplane and the expander are the devices design for connecting multiple hard drives with multiple device slots. However, in such a complex hard disk system, the user has to manually establish the relation between the hard disk addresses and the device slots, which is a time-consuming process. Further, in order to monitor the hard disk system to make the data access more efficient, it's necessary to build a real time monitoring mechanism.

Accordingly, what is needed is a hard disk system state monitoring method to establish a real time database of the hard disks automatically to perform the monitoring mechanism. The present invention addresses such a need.

SUMMARY

A hard disk system state monitoring method is provided. The hard disk system state monitoring method is to monitor the state of a hard disk system. The hard disk system comprises a backplane, an expander and a plurality of hard disks adapted in the device slots of the backplane. The hard disk system state monitoring method comprises the steps of: retrieving a logic and physical address mapping table from the expander; retrieving a physical address and device slot number mapping table; generating a logical address and device slot number mapping table according to the logic and physical address mapping table and physical address and device slot number mapping table; receiving a plurality of hard disk instant state signals; and establishing a hard disk system state database according to the logical address and device slot number mapping table and the hard disk instant state signals.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
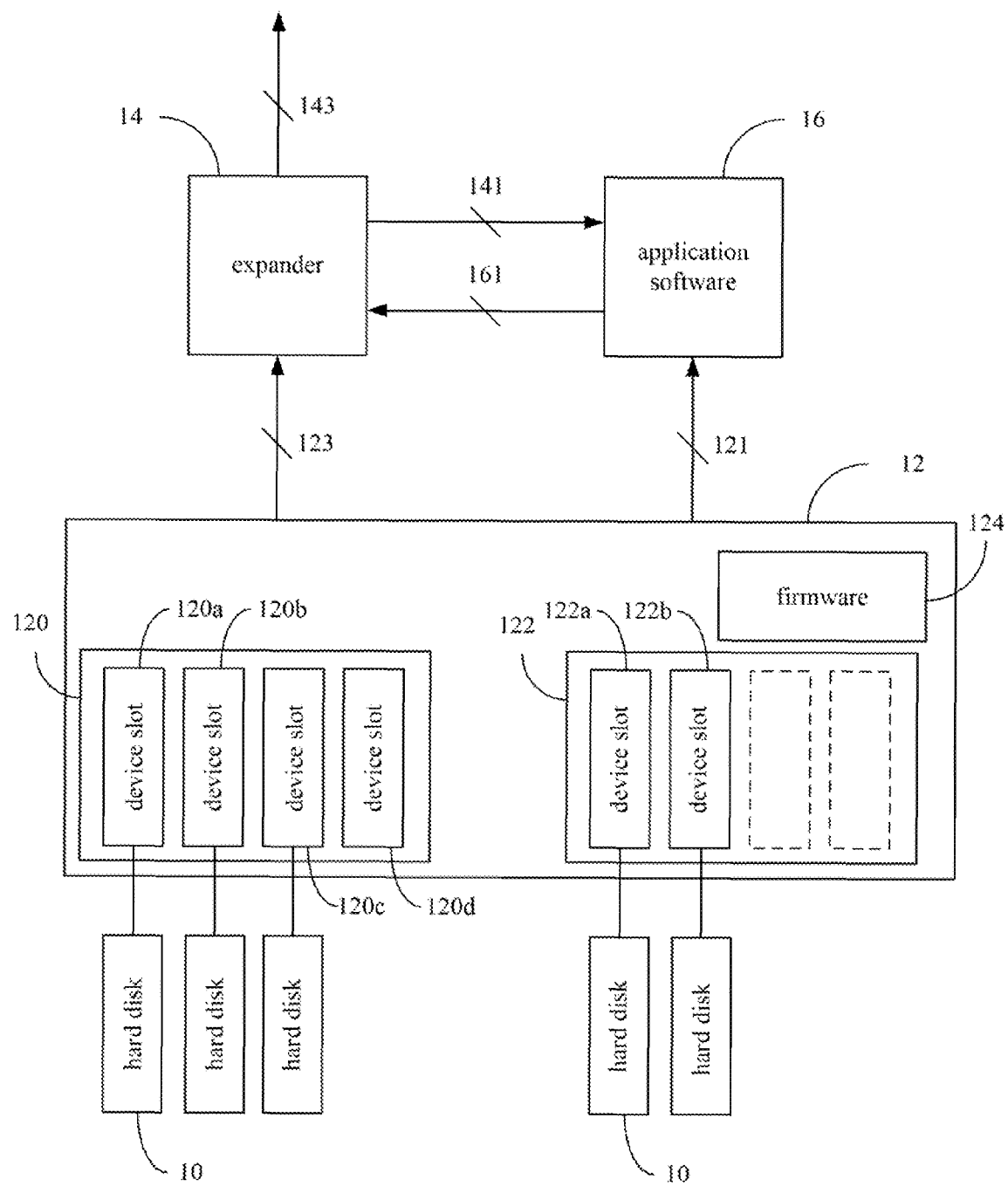
FIG. 1, a diagram of a hard disk system, wherein the hard disk system state monitoring method of the present invention is adapted to the hard disk system.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1, a diagram of a hard disk system 1, wherein the hard disk system state monitoring method of the present invention is adapted to the hard disk system 1. The hard disk system 1 comprises five hard disks 10, a backplane 12 and an expander 14. Each of the hard disks 10 in the present embodiment is a small computer system interface (SCSI) hard disk respectively. In other embodiment, the hard disks with other kind of interface can be used. The backplane substantially comprises two device slot groups 120 and 122. The device slot group 120 comprises four device slots 120a, 120b, 120c and 120d. The device slot group 122 comprises two device slots 122a and 122b. Three of the five hard disks 10 are connected to the device slots 120a, 120b and 120c, wherein the remaining two are connected to the device slot 122a and 122b. Thus, the device slot 120d is empty. In other embodiment, the number of the device slot group, the number of the device slot of each device slot group and the number of hard disks connected on the device slot can be different according to different conditions. Each device slot has its own physical address. The backplane 12 comprises a firmware 124 to store a physical address and device slot number mapping table 121. The physical address and device slot number mapping table 121 comprises the information of the corresponding physical addresses of each device slots. The expander 14 is substantially a host bus adapter (HBA). The expander 14 is connected to the backplane 12 and further connected to a host (not shown). The host performs the data access on the hard disk system 1 according to the logical addresses which is different from the physical addresses. Thus, the expander 14 has to provide a logic and physical address mapping table 141 such that the host can access the data.

The first embodiment of the present invention is a hard disk system state monitoring method. At first, the logic and physical address mapping table 141 and the physical address and device slot number mapping table 121 will be retrieved from the expander 14 and the firmware 124 of the backplane 12. An application software 16 generates a logical address and device slot number mapping table 161 according to the logic and physical address mapping table 141 and physical address and device slot number mapping table 161. After the generation process, the logical address and device slot number mapping table 161 is stored in the expander 14 in the present embodiment. The expander 14 further receives a plurality of hard disk instant state signals 123 in a real time manner. The hard disk instant state signals 123 are serial general purpose input output (SGPIO) signals. In the present embodiment, each of the hard disk instant state signals 123 is a three bits signal. Each bit represents a connecting condition of a device slot and a hard disk. In an embodiment, the first bit stands for the connecting condition of the hard disk. Take the hard disk system 1 described above as an examples the device slot group 120 comprises four device slots 120a, 120b, 120c and 120d, wherein there is no hard disk adapted to the device slot 120d. Thus, the value of the first bit of the device slot 120d shows that the hard disk doesn't exist. The second bit stands for the connecting condition of the device slot, i.e. the connecting condition in each device slot group. Take the hard disk system 1 described above as an example, the device slot group 120 comprises four device slots 120a, 120b, 120c and 120d.

However, the device slot group 122 has only two device slots 122a and 122b, Thus, the second bit of hard disk instant state signals 123 of the "third" and the "fourth" device slot of the device slot group 122 show that the device slot doesn't exist. The third bit stands for the id number of the device slot group that each device slot belongs to. For example, if the id number of the device slot group 120 is 0 and the id number of the device slot group 122 is 1, then the hard disk instant state signals 123 corresponding to the device slot 120a, 120d and 122a are 110, 010 and 111 respectively. The hard disk instant state signals 123 corresponding to the non-exist device slots of the device slot group 122 are both 001. Thus, the combination of the hard disk instant state signals 123 of the whole system is sent to the expander 14. It's noticed that in other embodiment, the number of the entries and the information carried by each entry can be different.

Figure 2:
FIG. 2 is a diagram of the hard disk system state database in an embodiment of the present invention.

The expander 14 then establishes a hard disk system state database 143 according to the logical address and device slot number mapping table 161 and the hard disk instant state signals 123. Please refer to FIG. 2, a diagram of the hard disk system state database 143 in an embodiment of the present invention. According to the logical address and device slot number mapping table 161 and the hard disk instant state signals 123, the content of the hard disk system state database comprises the information of the logical addresses, the physical address, the real time hard disk states, the id number of the device slot group, the device slot connecting condition and the hard disk connecting condition of each device slots. Similarly, the number of the entries and the information carried by each entry of the database can be different.

The expander 14 substantially comprises lots of modules, e.g. SCSI enclosure service (SES), symmetric multiprocessing command and command server, etc (not shown). These modules are responsible for monitoring the condition the peripheral devices connected to the expander 14. After the establishment of the hard disk system state database 143, these modules can get the real time information of the hard disk system 1 to further determine how to perform data access. Thus, the overall performance of the data access improves.

Figure 3:
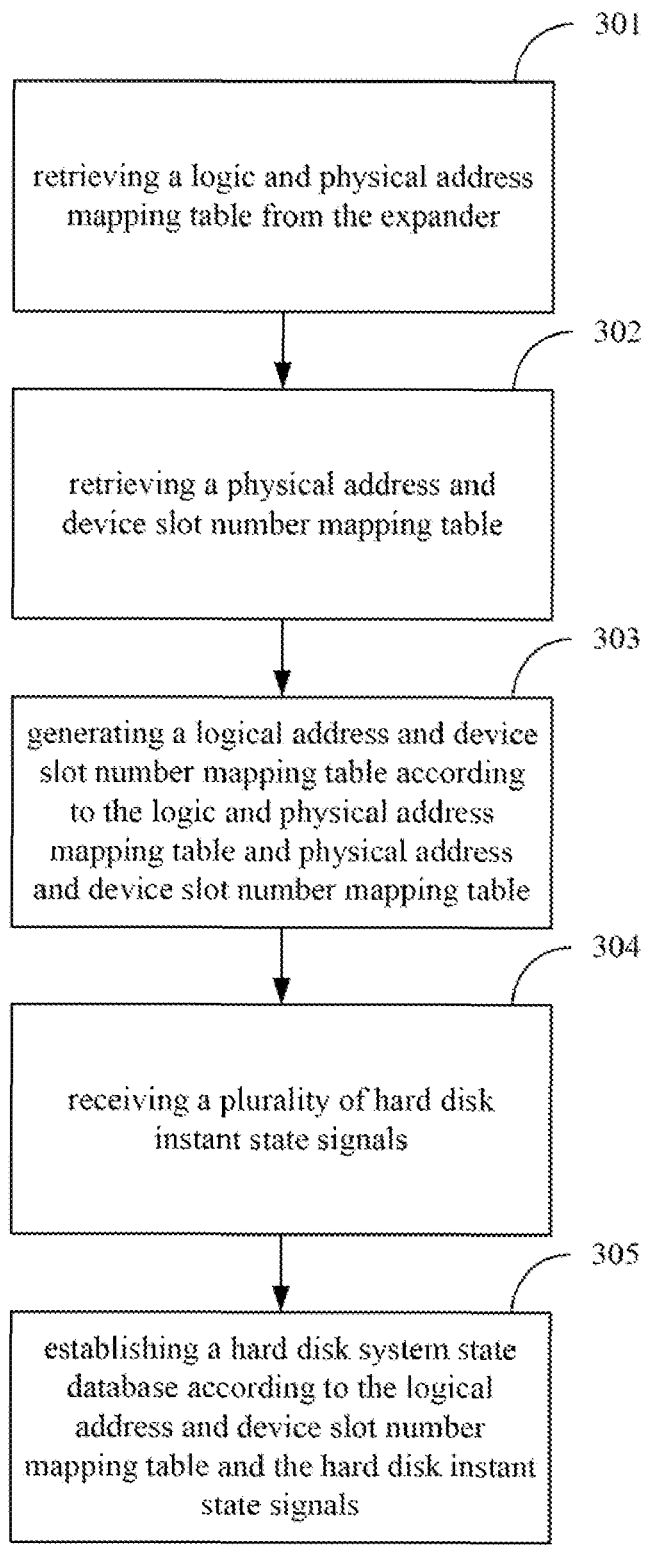
FIG. 3 is a flow chart of the hard disk system state monitoring method in an embodiment of the present invention.

FIG. 3 is a flow chart of the hard disk system state monitoring method in an embodiment of the present invention. The hard disk system state monitoring method is to monitor the state of a hard disk system. The hard disk system comprises a backplane, an expander and a plurality of hard disks adapted in the device slots of the backplane. The hard disk system state monitoring method comprises the steps of: in step 301, retrieving a logic and physical address mapping table from the expander; in step 302, retrieving a physical address and device slot number mapping table; in step 303, generating a logical address and device slot number mapping table according to the logic and physical address mapping table and physical address and device slot number mapping table; in step 304, receiving a plurality of hard disk instant state signals; and in step 305, establishing a hard disk system state database according to the logical address and device slot number mapping table and the hard disk instant state signals.

The advantage of the hard disk system state monitoring method in the present invention is to generate the logical address and device slot number mapping table automatically and further receives the hard disk instant state signals in a real time manner to establish the hard disk system state database. Thus, the monitoring mechanism of the hard disk system is realized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hard disk system state monitoring method to monitor the state of a hard disk system, wherein the hard disk system comprises a backplane, an expander and a plurality of hard disks adapted in the device slots of the backplane, the backplane is connected to the expander, the hard disk system state monitoring method comprises the steps of:
    retrieving a logic and physical address mapping table from the expander;
    retrieving a physical address and device slot number mapping table;
    generating a logical address and device slot number mapping table according to the logic and physical address mapping table and physical address and device slot number mapping table;
    receiving a plurality of hard disk instant state signals; and
    establishing a hard disk system state database according to the logical address and device slot number mapping table and the hard disk instant state signals.

2. The hard disk system state monitoring method of claim 1, wherein the plurality of hard disk instant state signals comprise a connecting condition information of the device slots and a connecting condition information of the hard disks.

3. The hard disk system state monitoring method of claim 1, wherein the plurality of hard disk instant state signals are serial general purpose input output (SGPIO) signals.

4. The hard disk system state monitoring method of claim 1, wherein the physical address and device slot number mapping table is retrieved from a firmware of the backplane.

5. The hard disk system state monitoring method of claim 1, wherein the expander is a host bus adapter (HBA) to receive the plurality of hard disk instant state signals from the backplane and establish the hard disk system state database according to the logical address and device slot number mapping table and the hard disk instant state signals.

6. The hard disk system state monitoring method of claim 1, the hard disk system state database comprises the information of the relationship among the logic address, the physical address and the device slot number and the connecting condition of each hard disk.

7. The hard disk system state monitoring method of claim 1, wherein the plurality of device slots are separated into a plurality of device slot group, the hard disk system state database comprises the connecting condition of each device slot and the number of the device slot group.

8. The hard disk system state monitoring method of claim 1, wherein the plurality of hard disk are a small computer system interface (SCSI) hard disk respectively.

9. The hard disk system state monitoring method of claim 1, wherein the logical address and device slot number mapping table is generated by an application software.

* * * * *